(12) United States Patent
Nukui et al.

(10) Patent No.: US 12,195,600 B1
(45) Date of Patent: Jan. 14, 2025

(54) FLAT-CROSS-SECTION GLASS FIBER, GLASS-FIBER-REINFORCED RESIN COMPOSITION, AND GLASS-FIBER-REINFORCED RESIN MOLDED PRODUCT

(71) Applicant: NITTO BOSEKI CO., LTD., Fukushima (JP)

(72) Inventors: Yosuke Nukui, Fukushima (JP); Masaru Urushizaki, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 18/726,223

(22) PCT Filed: Jan. 26, 2023

(86) PCT No.: PCT/JP2023/002391
§ 371 (c)(1),
(2) Date: Jul. 2, 2024

(87) PCT Pub. No.: WO2024/157412
PCT Pub. Date: Aug. 2, 2024

(51) Int. Cl.
C08J 5/08 (2006.01)
C03B 37/02 (2006.01)
C03C 13/00 (2006.01)

(52) U.S. Cl.
CPC ............ *C08J 5/08* (2013.01); *C03B 37/02* (2013.01); *C03C 13/00* (2013.01); *C03B 2203/02* (2013.01); *C03C 2213/00* (2013.01); *C08J 2377/02* (2013.01)

(58) Field of Classification Search
None
See application file for complete search history.

(56) References Cited

U.S. PATENT DOCUMENTS

| | | | |
|---|---|---|---|
| 6,543,258 B1 * | 4/2003 | Konno | D04H 1/43838 65/497 |
| 11,091,596 B2 * | 8/2021 | Nukui | C08J 5/043 |
| 2003/0131632 A1 * | 7/2003 | Konno | C03B 37/083 65/497 |

FOREIGN PATENT DOCUMENTS

| | | | | |
|---|---|---|---|---|
| CN | 103193384 A | | 7/2013 | |
| JP | 2000-103635 A | | 4/2000 | |
| JP | 2009-007252 A | | 1/2009 | |
| JP | 2009-256203 A | | 11/2009 | |
| KR | 20010032871 A | * | 4/2001 | ........... C03B 37/083 |
| WO | 99/28543 A1 | | 6/1999 | |
| WO | 2020/137004 A1 | | 7/2020 | |

OTHER PUBLICATIONS

PCT/ISA/220, 210,237, the International Search Report and Written Opinion from International Application No. PCT/JP2023/002391, not yet published, both dated Apr. 25, 2023.

* cited by examiner

*Primary Examiner* — Peter A Salamon
(74) *Attorney, Agent, or Firm* — Carrier, Shende & Associates P.C.; Joseph P. Carrier; Fulchand P. Shende

(57) ABSTRACT

A glass fiber including a plurality of flat-cross-section glass filaments each having a cross-section in flat shape, the cross-section having a major axis in the range of 15.0 to 25.0 μm, a minor axis in the range of 8.0 to 12.0 μm, and an irregular shape ratio R, being the ratio of the major axis to the minor axis (major axis/minor axis), in the range of 1.5 to 3.0. The flat-cross-section glass fiber has a packing rate P, being the ratio of the cross-sectional area of each flat-cross-section glass filament to the area of a rectangle circumscribing the cross-section of the flat-cross-section glass filament, in the range of 80.1 to 89.9%, and the irregular shape ratio R and the packing rate P satisfy the following formula (1): $337.6 \le P^{3/2}/R \le 421.2$ ... (1).

4 Claims, No Drawings

FLAT-CROSS-SECTION GLASS FIBER, GLASS-FIBER-REINFORCED RESIN COMPOSITION, AND GLASS-FIBER-REINFORCED RESIN MOLDED PRODUCT

TECHNICAL FIELD

The present invention relates to flat-cross-section glass fiber, a glass-fiber-reinforced resin composition, and a glass-fiber-reinforced resin molded product.

BACKGROUND ART

Glass-fiber-reinforced resin molded products containing glass fiber including a plurality of flat-cross-section glass filaments, the cross-section of each of which has a flat shape (hereinafter, may be referred to as flat-cross-section glass fiber) have been known (e.g., see Patent Literature 1).

In particular, glass-fiber-reinforced resin molded products containing glass fiber including a plurality of flat-cross-section glass filaments each having a cross-section in long-oval shape (a shape given by substituting each of the short sides of a rectangle with a semicircle, the diameter of which coincides with the short side) (hereinafter, the glass filaments may be referred to as long-oval-cross-section glass filaments, and the glass fiber may be referred to as long-oval-cross-section glass fiber) is better in dimensional stability with less occurrence of warpage than glass-fiber-reinforced resin molded products containing glass fiber including a plurality of glass filaments, the cross-section of each of which has a circular shape (hereinafter, may be referred to as circular-cross-section glass fiber), and furthermore excellent in mechanical-physical properties such as tensile strength, thus being used for parts characterized by lightness, thinness, shortness, and smallness such as housings of portable electronic devices.

CITATION LIST

Patent Literature

Patent Literature 1: International Publication No. WO 2020/137004

SUMMARY OF INVENTION

Technical Problem

However, the frequency of breaking of filaments in spinning is larger for long-oval-cross-section glass fiber than for circular-cross-section glass fiber, and thus long-oval-cross-section glass fiber has a disadvantage of poor spinnability.

In addition, the long-oval-cross-section glass fiber (glass strand) including a plurality of long-oval-cross-section glass filaments, when being cut into chopped strands of predetermined length, more frequently causes the abrasion of cutting blades than the circular-cross-section glass fiber, leading to increased frequency of cutting blade exchange, and thus has a disadvantage of poor chopped strand productivity.

An object of the present invention is to provide flat-cross-section glass fiber that, when being processed into a glass-fiber-reinforced resin molded product, can give better spinnability and chopped strand productivity than the long-oval-cross-section glass fiber, solving the disadvantages, in combination with keeping dimensional stability and mechanical-physical properties such as tensile strength comparable to those of the long-oval-cross-section glass fiber.

Solution to Problem

To achieve the object, the present invention provides glass fiber including a plurality of flat-cross-section glass filaments each having a cross-section in flat shape, the cross-section having a major axis in the range of 15.0 to 25.0 μm, a minor axis in the range of 8.0 to 12.0 μm, and an irregular shape ratio R, being the ratio of the major axis to the minor axis (major axis/minor axis), in the range of 1.5 to 3.0, wherein the flat-cross-section glass fiber has a packing rate P, being the ratio of the cross-sectional area of each flat-cross-section glass filament to the area of a rectangle circumscribing the cross-section of the flat-cross-section glass filament (cross-sectional area of flat-cross-section glass filament/area of rectangle circumscribing cross-section of flat-cross-section glass filament), in the range of 80.1 to 89.9%, and the irregular shape ratio R and the packing rate P satisfy the following formula (1):

$$337.6 \leq P^{3/2}/R \leq 421.2 \tag{1}$$

The irregular shape ratio R and the packing rate P in the flat-cross-section glass fiber of the present invention preferably satisfy the following formula (2):

$$361.9 \leq P^{3/2}/R \leq 382.5 \tag{2}$$

The glass-fiber-reinforced resin composition of the present invention contains the flat-cross-section glass fiber of the present invention in a resin composition.

The glass-fiber-reinforced resin molded product of the present invention is formed from the glass-fiber-reinforced resin composition of the present invention.

According to the flat-cross-section glass fiber of the present invention, in which the irregular shape ratio R and the packing rate P satisfy the formula (1), better spinnability and chopped strand productivity than long-oval-cross-section glass fiber can be given in combination with keeping dimensional stability and mechanical-physical properties such as tensile strength comparable to those of glass-fiber-reinforced resin molded products containing long-oval-cross-section glass fiber in the glass-fiber-reinforced resin molded product of the present invention.

Here, keeping dimensional stability comparable to those of glass-fiber-reinforced resin molded products containing long-oval-cross-section glass fiber means that the warpage of the glass-fiber-reinforced resin molded product as measured with a measurement method described later is 10.0 mm or less. Keeping mechanical-physical properties comparable to those of glass-fiber-reinforced resin molded products containing long-oval-cross-section glass fiber means that the tensile strength as measured with a measurement method described later is 230 MPa or more.

Giving better spinnability means that the frequency of filament breaking as counted with a count method described later is less than 10 times. Giving better chopped strand productivity means that the frequency of cutter exchange as counted with a count method described later is less than 30 times.

The flat-cross-section glass fiber of the present invention, when the irregular shape ratio R and the packing rate P satisfy the formula (2), can give better dimensional stability and mechanical-physical properties such as tensile strength than glass-fiber-reinforced resin molded product containing long-oval-cross-section glass fiber in the glass-fiber-reinforced molded product of the present invention, and give better spinnability and chopped strand productivity than long-oval-cross-section glass fiber.

Here, giving better dimensional stability than fiber-reinforced resin molded products containing long-oval-cross-section glass fiber means that the warpage of the glass-fiber-reinforced resin molded product as measured with a method described later is 7.5 mm or less. Giving better mechanical-physical properties than fiber-reinforced resin molded products containing long-oval-cross-section glass fiber means that the tensile strength as measured with a method described later is 240 MPa or more.

Giving better spinnability means that the frequency of filament breaking as counted with a method described later is less than 9 times. Giving better chopped strand productivity means that the frequency of cutter exchange as counted with a method described later is less than 20 times.

According to the glass-fiber-reinforced resin molded product of the present invention, dimensional stability and mechanical-physical properties such as tensile strength comparable to those of glass-fiber-reinforced resin molded products containing long-oval-cross-section glass fiber can be kept.

Here, the meaning of keeping the dimensional stability and mechanical-physical properties such as tensile strength comparable to those of glass-fiber-reinforced resin molded products containing Jong-oval-cross-section glass fiber is the same as described above.

DESCRIPTION OF EMBODIMENTS

Hereinafter, embodiments of the present invention will be described in detail.

The flat-cross-section glass fiber of the present embodiment includes a plurality of flat-cross-section glass filaments each having a cross-section in flat shape, and the cross-section of each flat-cross-section glass filament has a major axis in the range of 15.0 to 25.0 µm, a minor axis in the range of 8.0 to 12.0 µm, and an irregular shape ratio R in the range of 1.5 to 3.0. Here, the cross-section of a flat-cross-section glass filament is a transverse cross-section perpendicular to the length direction of the flat-cross-section glass filament, and the irregular shape ratio R is the ratio of the major axis to the minor axis (major axis/minor axis).

The flat-cross-section glass fiber of the present embodiment has a packing rate P in the range of 80.1 to 89.9%, and the irregular shape ratio R and the packing rate P satisfy the following formula (1), and preferably satisfy the following formula (2):

$$337.6 \le P^{3/2}/R \le 421.2 \quad (1)$$

$$361.9 \le P^{3/2}/R \le 382.5 \quad (2)$$

Here, the packing rate P is the ratio of the cross-sectional area of each flat-cross-section glass filament to the area of a rectangle circumscribing the cross-section of the flat-cross-section glass filament (cross-sectional area of flat-cross-section glass filament/area of rectangle circumscribing cross-section of flat-cross-section glass filament).

The flat-cross-section glass fiber of the present embodiment can be manufactured, for example, with the following method. First, a glass raw material (glass batch) prepared to have a specific glass composition is supplied to a melting furnace, and is melted, for example, at a temperature in the range of 1450 to 1550° C. Next, the melted glass batch (molten glass) is drawn from 10 to 30000 nozzle tips of a bushing controlled at a predetermined temperature and rapidly cooled to give flat-cross-section glass filaments, wherein each of the nozzle tips is provided with a non-circular shape such as a shape corresponding to the individual cross-sectional shape of the flat-cross-section glass filaments and with a protrusion or a notch for rapidly cooling the molten glass and controlling the temperature condition.

Then, a sizing agent or binder is applied with an applicator as a coating machine, and 10 to 30000 flat-cross-section glass filaments are bundled together with a sizing shoe and simultaneously wound around a tube by a winder at high speed, giving the flat-cross-section glass fiber of the present embodiment. In the flat-cross-section glass fiber of the present embodiment, the flat-cross-section glass filaments account for more than 50% of the glass filaments constituting the flat-cross-section glass fiber, preferably 80% or more thereof, more preferably 90% or more thereof, and still more preferably 100% thereof.

The minor axis and major axis of each flat-cross-section glass filament included in the flat-cross-section glass fiber of the present embodiment can be adjusted, for example, through adjusting the major axis and minor axis of each nozzle tip, the winding speed, and the temperature condition. For example, the minor axis and major axis can be decreased by increasing the winding speed, and the minor axis and major axis can be increased by decreasing the winding speed.

The glass composition of the glass forming the flat-cross-section glass fiber of the present embodiment is not limited, and can be, for example, an E glass composition, which is the most versatile glass composition. The E glass composition is a composition containing $SiO_2$ in the range of 52.0 to 56.0% by mass, $Al_2O_3$ in the range of 12.0 to 16.0% by mass, MgO and CaO in the range of 20.0 to 25.0% by mass in total, and $B_2O_3$ in the range of 5.0 to 10.0% by mass, with respect to the total amount of glass filaments.

Examples of the form of the flat-cross-section glass fiber include glass yarns, glass chopped strands, glass rovings, glass powders, and glass filament mats. The glass fiber may be in a state of a glass cloth composed of glass yarns or glass rovings or a chopped strand mat composed of glass chopped strands, or in a state in which glass filaments are dispersed in a glass-fiber-reinforced resin molded product.

In the case where the flat-cross-section glass fiber of the present embodiment is chopped strands, the number of glass filaments constituting the flat-cross-section glass fiber is, for example, 10 to 20000, preferably 50 to 10000, and more preferably 1000 to 8000. The length of each of the chopped strands as the flat-cross-section glass fiber of the present embodiment is, for example, 1.0 to 100.0 mm, preferably 1.2 to 51.0 mm, more preferably 1.5 to 30.0 mm, still more preferably 2.0 to 15.0 mm, and particularly preferably 2.3 to 7.8 mm. Here, the chopped strands can be obtained by cutting the flat-cross-section glass fiber manufactured by the method described above to give the specific length with a known apparatus such as a long-fiber cutting machine configured to send a glass strand between a cutter roller provided with cutters (cutting blades) radially disposed at equal intervals and a rubber roller rotatable in contact with the cutter roller and equipped with a rubber on the outer peripheral surface and cut the glass strand.

In the case where the flat-cross-section glass fiber of the present embodiment is a roving, the number of glass filaments constituting the flat-cross-section glass fiber is, for example, 200 to 30000. The mass per unit area of the roving as the flat-cross-section glass fiber of the present embodiment is 35 to 10000 tex (g/km).

In the case where the flat-cross-section glass fiber of the present embodiment is glass powder (may be referred to as cut fiber), the number of glass filaments constituting the flat-cross-section glass fiber is, for example, 10 to 20000. The length of the glass powder as the flat-cross-section glass fiber of the present embodiment is, for example, 0.001 to 0.900 mm. Here, the glass powder can be obtained by pulverizing the flat-cross-section glass fiber manufactured with the method described above to give the specific length by means of a known method such as a ball mill or Henschel mixer.

The major axis and minor axis of the cross-section in the flat-cross-section glass fiber of the present embodiment can be measured, for example, as follows.

In the case where the flat-cross-section glass fiber of the present embodiment is not contained in a glass-fiber-reinforced resin molded product, the flat-cross-section glass fiber is embedded in a resin such as an epoxy resin and the resin is cured, the cured resin is cut and the cross-section is polished, and the cross-section of the cured resin is then observed with an electron microscope. For each of all or 200 or more of the flat-cross-section glass filaments constituting the flat-cross-section glass fiber and exposed in the cross-section of the cured resin, the longest side passing through substantially the center of the flat-cross-section glass filament and the side orthogonally intersecting with the longest side at substantially the center of the flat-cross-section glass filament are measured as the major axis and the minor axis, respectively.

In the case where the flat-cross-section glass fiber is contained in a glass-fiber-reinforced resin molded product, the glass-fiber-reinforced resin molded product is cut and the cross-section is polished, and the cross-section of the resin is then observed with an electron microscope. For each of 200 or more of the flat-cross-section glass filaments constituting the flat-cross-section glass fiber and exposed in the cross-section of the resin, the longest side passing through substantially the center of the flat-cross-section glass filament and the side orthogonally intersecting with the longest side at substantially the center of the flat-cross-section glass filament are measured as the major axis and the minor axis, respectively.

Here, both in the case where the flat-cross-section glass filaments is not contained in a glass-fiber-reinforced resin molded product and in the case where the flat-cross-section glass filaments is contained in a glass-fiber-reinforced resin molded product, the major axis and minor axis of the cross-section can be measured even through image processing with an automated analyzer for an image acquired with an electron microscope. The cross-section of each of the flat-cross-section glass filaments in the flat-cross-section glass fiber of the present invention has a major axis in the range of 15.0 to 25.0 μm, preferably in the range of 16.1 to 23.9 μm, more preferably in the range of 17.1 to 22.4 μm.

The cross-section of each of the flat-cross-section glass filaments in the flat-cross-section glass fiber of the present invention has a minor axis in the range of 8.0 to 12.0 μm, preferably in the range of 8.6 to 11.4 μm, more preferably in the range of 9.1 to 11.0 μm.

From the major axis and minor axis of the cross-section determined as above, the irregular shape ratio R can be calculated as the ratio of the major axis to the minor axis (major axis/minor axis).

From the major axis and minor axis of the cross-section determined as above, the area of a rectangle circumscribing the cross-section of each of the flat-cross-section glass filaments can be calculated as the product of the minor axis and the major axis (minor axis×major axis), and the cross-sectional area of each of the flat-cross-section glass filaments can be measured, for example, with known image analysis software such as "A-Zo Kun"®, manufactured by Asahi Kasei Engineering Corporation) in measuring the major axis and minor axis of the cross-section.

From the area of a rectangle circumscribing the cross-section of each of the flat-cross-section glass filaments and the cross-sectional area of the flat-cross-section glass filament, the packing rate P can be calculated as the ratio of the cross-sectional area of each of the flat-cross-section glass filaments to the area of a rectangle circumscribing the cross-section of the flat-cross-section glass filament (cross-sectional area of flat-cross-section glass filament/area of rectangle circumscribing cross-section of flat-cross-section glass filament).

When the irregular shape ratio R of the flat-cross-section glass fiber of the present embodiment is more than 3.0, lower spinnability and chopped strand productivity are caused, and when the irregular shape ratio R is less than 1.5, sufficient dimensional stability and mechanical-physical properties such as tensile strength are not given in the glass-fiber-reinforced resin molded product of the present invention.

The irregular shape ratio R in the flat glass fiber of the present embodiment is preferably in the range of 1.6 to 2.8, more preferably in the range of 1.7 to 2.5, and still more preferably in the range of 1.8 to 2.3.

When the packing rate P of the flat-cross-section glass fiber of the present invention is more than 89.9%, the cross-sectional shape is excessively approximate to a rectangle, resulting in lower spinnability and chopped strand productivity, and when the packing rate P is less than 80.1%, the cross-sectional shape is excessively approximate to an oval, and as a result sufficient mechanical-physical properties such as tensile strength are not given in the glass-fiber-reinforced resin molded product of the present invention.

The packing rate P of the flat-cross-section glass fiber of the present embodiment is preferably in the range of 86.4% or less, more preferably in the range of 84.9% or less, still more preferably in the range of 80.6 to 84.4%, and particularly preferably in the range of 81.6 to 83.9%.

The flat-cross-section glass fiber of the present embodiment preferably has a cross-sectional shape substantially symmetric with respect to the longest side passing through substantially the center of the flat-cross-section glass filament.

As the packing rate P of the flat-cross-section glass fiber of the present embodiment is larger, the improving effects for tensile strength and warpage are higher, but deteriorated spinnability and chopped strand manufacturability tend to result. On the other hand, as the irregular shape ratio R is larger, the improving effects for tensile strength and warpage are higher, but deteriorated spinnability and chopped strand manufacturability result. The formula (1) is inferred to represent such balance.

According to the flat-cross-section glass fiber of the present embodiment, when the irregular shape ratio R and the packing rate P satisfy the formula (1), better spinnability and chopped strand productivity than long-oval-cross-section glass fiber can be given in combination with keeping dimensional stability and mechanical-physical properties such as tensile strength comparable to those of glass-fiber-reinforced resin molded products containing long-oval-cross-section glass fiber in the glass-fiber-reinforced resin molded product of the present embodiment containing the flat-cross-section glass fiber.

Keeping dimensional stability comparable to those of glass-fiber-reinforced resin molded products containing long-oval-cross-section glass fiber means that the warpage of the glass-fiber-reinforced resin molded product as measured with a measurement method described later is 10.0 mm or less. Keeping mechanical-physical properties comparable to those of glass-fiber-reinforced resin molded products containing long-oval-cross-section glass fiber means that the tensile strength as measured with a measurement method described later is 230 MPa or more.

Giving better spinnability means that the frequency of filament breaking as counted with a count method described later is less than 10 times. Giving better chopped strand productivity means that the frequency of cutter exchange as counted with a count method described later is less than 30 times.

[Method for Measuring Warpage of Glass-Fiber-Reinforced Resin Molded Product]

First, the surface of the flat-cross-section glass fiber is coated with a composition containing a silane coupling agent, and cut into chopped strands of 3 mm in length. Subsequently, the chopped strands and polyamide 6 resin (manufactured by Ube Industries, Ltd., product name: UBE1015B) are kneaded with a twin-screw kneader (manufactured by SHIBAURA MACHINE CO., LTD., product name: TEM-26SS) at a screw rotational frequency of 100 rpm and a temperature of 270° C. to produce resin pellets having a glass fiber content of 50% by mass.

Subsequently, the resin pellets are injection-molded with an injection molding machine (manufactured by Nissei Plastic Industrial Co. Ltd., product name: NEX80) at a mold temperature of 80° C. and an injection temperature of 270° C. to form a test piece for warpage measurement in the form of a plate having dimensions of 80 mm in length×60 mm in width×1 mm in thickness. A corner of the test piece for warpage measurement is placed on a flat plane, and a gap generated between the corner at the diagonal position to the corner placed on the flat plane and the flat plane is measured with a caliper. Such a gap is measured for each of the four corners of the test piece for warpage measurement as placed on the flat plane, and the mean of the measurements is used as the value of warpage.

[Method for Measuring Tensile Strength of Glass-Fiber-Reinforced Resin Molded Product]

The resin pellets are injection-molded with an injection molding machine (manufactured by Nissei Plastic Industrial Co. Ltd., product name: NEX80) at a mold temperature of 80° C. and an injection temperature of 270° C. to form a type-A dumbbell test piece (thickness: 4 mm) in accordance with JIS K 7165:2008. The type-A dumbbell test piece is subjected to static tensile test in accordance with JIS K 7165:2008 with a universal testing machine (manufactured by Shimadzu Corporation, product name: AUTOGRAPH AG-5000B) to measure the tensile strength under a test temperature of 23° C.

[Method for Counting Frequency of Filament Breaking]

In manufacturing the flat-cross-section glass fiber for 30 days, the number of the occurrence of breaking of flat-cross-section glass filaments constituting the flat-cross-section glass fiber per shift was counted, wherein one shift corresponds to 8 hours. The mean number of breaking per shift is used as the frequency of filament breaking, wherein one shift corresponds to 8 hours.

[Method for Counting Chopped Strand Productivity]

In manufacturing chopped strands for 240 hours by cutting a glass strand, which has been obtained by coating the surface of the flat-cross-section glass fiber with a composition containing a silane coupling agent, into pieces of 3 mm in length with a long-fiber cutting machine configured to send a glass strand between a cutter roller provided with cutters (cutting blades) radially disposed at equal intervals and a rubber roller rotatable in contact with the cutter roller and equipped with a rubber on the outer peripheral surface and cut the glass strand, the frequency of exchanging the cutters is counted.

The flat-cross-section glass fiber of the present embodiment, when the irregular shape ratio R and the packing rate P satisfy the formula (2), can give better dimensional stability and mechanical-physical properties such as tensile strength than glass-fiber-reinforced resin molded products containing long-oval-cross-section glass fiber in the glass-fiber-reinforced molded product of the present invention, and can give better spinnability than long-oval-cross-section glass fiber.

Here, giving better dimensional stability than fiber-reinforced resin molded products containing long-oval-cross-section glass fiber means that the warpage of the glass-fiber-reinforced resin molded product as measured with the method described above is 7.5 mm or less. Giving better mechanical-physical properties than fiber-reinforced resin molded products containing long-oval-cross-section glass fiber means that the tensile strength as measured with the method described above is 240 MPa or more.

Giving better spinnability means that the frequency of filament breaking as counted with the method described above is less than 9 times. Giving better chopped strand productivity means that the frequency of cutter exchange as counted with the method described above is less than 20 times.

Secondly, the glass-fiber-reinforced resin composition of the present embodiment contains the flat-cross-section glass fiber of the present embodiment in a resin composition.

Thirdly, the glass-fiber-reinforced resin molded product of the present embodiment is formed from the glass-fiber-reinforced resin composition of the present embodiment. According to the glass-fiber-reinforced resin molded product of the present embodiment, dimensional stability and mechanical-physical properties such as tensile strength comparable to those of glass-fiber-reinforced resin molded products containing long-oval-cross-section glass fiber can be kept.

Here, the meaning of keeping dimensional stability and mechanical-physical properties such as tensile strength comparable to those of glass-fiber-reinforced resin molded products containing long-oval-cross-section glass fiber is the same as described above.

Examples of the resin composition constituting the glass-fiber-reinforced resin composition of the present embodiment include a resin composition containing thermoplastic resin or thermosetting resin.

Examples of the thermoplastic resin can include polyethylene, polypropylene, polystyrene, styrene/maleic anhydride resins, styrene/maleimide resins, polyacrylonitrile, acrylonitrile/styrene (AS) resins, acrylonitrile/butadiene/styrene (ABS) resins, chlorinated polyethylene/acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide, polyacetal, polyethylene terephthalate (PET), polybutylene terephthalate (PBT), polytrimethylene terephthalate (PTT), polycarbonate, polyarylene sulfide, polyethersulfone (PES), polyphenylsulfone (PPSU), polyphenylene ether (PPE), modified polyphenylene ether (m-PPE), polyaryl etherketone, liquid crystal polymer (LCP), fluororesins, polyetherimide (PEI), polyarylate (PAR), polysulfone (PSF), polyamideimide (PAI), polyaminobismaleimide (PABM), thermoplastic polyimide (TPI), polyethylene naphthalate (PEN), ethylene/vinyl acetate (EVA) resins, ionomer (IO) resins, polybutadiene, styrene/butadiene resins, polybutylene, polymethylpentene, olefin/vinyl alcohol resins, cyclic olefin resins, cellulose resins, and polylactic acid.

Examples of the polyethylene can include high density polyethylene (HDPE), medium density polyethylene, low density polyethylene (LDPE), linear low density polyethylene (LLDPE), and ultra high molecular weight polyethylene.

Examples of the polypropylene can include isotactic polypropylene, atactic polypropylene, syndiotactic polypropylene, and mixtures thereof.

Examples of the polystyrene can include general-purpose polystyrene (GPPS), which is an atactic polystyrene having an atactic structure, high impact polystyrene (HIPS) with a rubber component added to GPPS, and syndiotactic polystyrene with syndiotactic structure.

Examples of the methacrylic resin can include polymers obtained by homopolymerizing one of acrylic acid, methacrylic acid, styrene, methyl acrylate, ethyl acrylate, ethyl methacrylate, butyl acrylate, butyl methacrylate, and fatty acid vinyl ester, or polymers obtained by copolymerizing two or more of these.

Examples of the polyvinyl chloride can include a vinyl chloride homopolymer, a copolymer of a vinyl chloride monomer and a copolymerizable monomer, or a graft copolymer obtained by graft polymerization of a vinyl chloride monomer to polymer polymerized by a conventionally known method such as emulsion polymerization method, suspension polymerization method, micro suspension polymerization method, or bulk polymerization method.

Examples of the polyamide can include one of components such as polycaproamide (polyamide 6), polyhexamethylene adipamide (polyamide 66), polytetramethylene adipamide (polyamide 46), polytetramethylene sebacamide (polyamide 410), polypentamethylene adipamide (polyamide 56), polypentamethylene sebacamide (polyamide 510), polyhexamethylene sebacamide (polyamide 610), polyhexamethylene dodecamide (polyamide 612), polydecamethylene adipamide (polyamide 106), polydecamethylene sebacamide (polyamide 1010), polydecamethylene dodecamide (polyamide 1012), polyundecanamide (polyamide 11), polyundecamethylene adipamide (polyamide 116), polydodecanamide (polyamide 12), polyxylene adipamide (polyamide XD6), polyxylene sebacamide (polyamide XD10), polymetaxylylene adipamide (polyamide MXD6), polyparaxylylene adipamide (polyamide PXD6), polytetramethylene terephthalamide (polyamide 4T), polypentamethylene terephthalamide (polyamide 5T), polyhexamethylene terephthalamide (polyamide 6T), polyhexamethylene isophthalamide (polyamide 6I), polynonamethylene terephthalamide (polyamide 9T), polydecamethylene terephthalamide (polyamide 10T), polyundecamethylene terephthalamide (polyamide 11T), polydodecamethylene terephthalamide (polyamide 12T), polytetramethylene isophthalamide (polyamide 4I), polybis(3-methyl-4-aminohexyl) methane terephthalamide (polyamide PACMT), polybis(3-methyl-4-aminohexyl) methane isophthalamide (polyamide PACMI), polybis(3-methyl-4-aminohexyl) methane dodecamide (polyamide PACM12), polybis(3-methyl-4-aminohexyl) methanetetradecamide (polyamide PACM14), or a copolymer obtained by a combination of a plurality of components of two or more thereof, or a mixture thereof.

Examples of the polyacetal can include a homopolymer with oxymethylene units as the main repeating unit, and a copolymer mainly consisting of oxymethylene units and containing oxyalkylene units having 2 to 8 adjacent carbon atoms in the main chain.

Examples of the polyethylene terephthalate can include a polymer obtained by polycondensation of terephthalic acid or a derivative thereof with ethylene glycol.

Examples of the polybutylene terephthalate can include a polymer obtained by polycondensation of terephthalic acid or a derivative thereof with 1,4-butanediol.

Examples of the polytrimethylene terephthalate can include polymers obtained by polycondensation of terephthalic acid or a derivative thereof with 1,3-propanediol.

Examples of the polycarbonate can include polymers obtained by a transesterification method in which a dihydroxydiaryl compound is reacted with a carbonate such as diphenyl carbonate in a molten state; or polymers obtained by phosgene method in which a dihydroxyaryl compound is reacted with phosgene.

Examples of the polyarylene sulfide can include linear polyphenylene sulfide, cross linked polyphenylene sulfide having a high molecular weight obtained by performing a curing reaction after polymerization, polyphenylene sulfide sulfone, polyphenylene sulfide ether, and polyphenylene sulfide ketone.

Examples of the modified polyphenylene ether can include: a polymer alloy of poly(2,6-dimethyl-1,4-phenylene) ether and polystyrene; a polymer alloy of poly(2,6-dimethyl-1,4-phenylene) ether and a styrene/butadiene copolymer; a polymer alloy of poly(2,6-dimethyl-1,4-phenylene) ether and a styrene/maleic anhydride copolymer; a polymer alloy of poly(2,6-dimethyl-1,4-phenylene) ether and polyamide; and a polymer alloy of poly(2,6-dimethyl-1,4-phenylene) ether and styrene/butadiene/acrylonitrile copolymer.

Examples of the polyaryl etherketone can include polyetherketone (PEK), polyetheretherketone (PEEK), polyetherketoneketone (PEKK), and polyetheretherketoneketone (PEEKK).

Examples of the liquid crystal polymer (LCP) include a polymer (copolymer) composed of one or more structural units selected from aromatic hydroxycarbonyl units which are thermotropic liquid crystal polyesters, aromatic dihydroxy units, aromatic dicarbonyl units, aliphatic dihydroxy units, aliphatic dicarbonyl units, and the like.

Examples of the fluororesin can include polytetrafluoroethylene (PTFE), perfluoroalkoxy resins (PFA), fluorinated ethylene propylene resins (FEP), fluorinated ethylene tetrafluoroethylene resins (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of the ionomer (IO) resin can include copolymers of an olefin or a styrene and an unsaturated carboxylic acid, wherein a part of carboxyl groups is neutralized with a metal ion.

Examples of the olefin/vinyl alcohol resin can include ethylene/vinyl alcohol copolymers, propylene/vinyl alcohol copolymers, saponified products of ethylene/vinyl acetate copolymers, and saponified products of propylene/vinyl acetate copolymers.

Examples of the cyclic olefin resin can include monocyclic compounds such as cyclohexene, polycyclic compounds such as tetracyclopentadiene, and polymers of cyclic olefin monomers.

Examples of the polylactic acid can include poly-L-lactic acid which is a homopolymer of L-form, poly-D-lactic acid which is a homopolymer of D-form, or a stereocomplex polylactic acid which is a mixture thereof.

Examples of the cellulose resin can include methylcellulose, ethyl cellulose, hydroxycellulose, hydroxymethylcellulose, hydroxyethyl cellulose, hydroxyethyl methylcellulose, hydroxypropylmethylcellulose, cellulose acetate, cellulose propionate, and cellulose butyrate.

Examples of the thermosetting resin can include unsaturated polyester resins, vinyl ester resins, epoxy (EP) resins, melamine (MF) resins, phenol resins (PF), urethane resins (PU), polyisocyanate, polyisocyanurate, polyimide (PI), urea (UF) resins, silicone (SI) resins, furan (FR) resins, benzoguanamine (BR) resins, alkyd resins, xylene resins, bismaleimide triazine (BT) resins, and diallyl phthalate resin (PDAP).

In the flat-cross-section glass fiber of the present embodiment, the flat-cross-section glass filaments constituting the flat-cross-section glass fiber may be in contact with or separated from each other. When the flat-cross-section glass filaments are separated from each other, a surface treatment agent or a resin composition constituting a glass-fiber-reinforced resin molded product may be present in interspaces of the flat-cross-section glass filaments.

Examples of the surface treatment agent include a resin such as urethane resin, epoxy resin, vinyl acetate resin, acrylic resin, modified polypropylene, particularly carboxylic acid-modified polypropylene, a copolymer of (poly) carboxylic acid, particularly maleic acid, and an unsaturated monomer, or a silane coupling agent.

The flat-cross-section glass fiber of the present embodiment may be coated with a composition containing a lubricant, a surfactant, or the like in addition to such a resin or silane coupling agent. The flat-cross-section glass fiber is coated with such a composition at a proportion of 0.1 to 2.0% by mass with respect to the mass of the flat-cross-section glass fiber in the state not coated with the composition.

The flat-cross-section glass fiber can be coated with an organic matter by applying the sizing agent or binder including a solution of the resin, the silane coupling agent, or a composition to the flat-cross-section glass fiber using a known method such as a roller applicator, for example, in the manufacturing process of the flat-cross-section glass fiber and then drying the flat-cross-section glass fiber to which the solution of the resin, the silane coupling agent, or the composition is applied.

Examples of the silane coupling agent here can include aminosilanes, chlorosilanes, epoxysilanes, mercaptosilanes, vinylsilanes, acrylsilanes, and cationic silanes. As the silane coupling agent, these compounds can be used singly or in combination of two or more.

Examples of the aminosilane include γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane, and γ-anilinopropyltrimethoxysilane.

Examples of the chlorosilane include γ-chloropropyltrimethoxysilane.

Examples of the epoxysilane include γ-glycidoxypropyltrimethoxysilane and β-(3,4-epoxy cyclohexyl)ethyltrimethoxysilane.

Examples of the mercaptosilane can include γ-mercaptotrimethoxysilane.

Examples of the vinylsilane include vinyl trimethoxysilane and N-β-(N-vinylbenzylaminoetbyl)-γ-aminopropyltrimethoxysilane.

Examples of the acrylsilane include γ-methacryloxypropyltrimethoxysilane.

Examples of the cationic silane include N-(vinylbenzyl)-2-aminoethyl-3-aminopropyltrimethoxysilane hydrochloride and N-phenyl-3-aminopropyltrimethoxysilane hydrochloride.

Examples of the lubricant include modified silicone oils, animal oils and hydrogenated products thereof, vegetable oils and hydrogenated products thereof, animal waxes, vegetable waxes, mineral waxes, condensates of a higher saturated fatty acid and a higher saturated alcohol, polyethyleneimine, polyalkylpolyamine alkylamide derivatives, fatty acid amides, and quaternary ammonium salts. As the lubricant, these can be used singly or in combinations of two or more.

Examples of the animal oil include beef tallow.

Examples of the vegetable oil include soybean oil, coconut oil, rapeseed oil, palm oil, and castor oil.

Examples of the animal wax include beeswax and lanolin.

Examples of the vegetable wax include candelilla wax and carnauba wax.

Examples of the mineral wax include paraffin wax and montan wax.

Examples of the condensate of a higher saturated fatty acid and a higher saturated alcohol include stearates such as lauryl stearate.

Examples of the fatty acid amide include dehydrated condensates of a polyethylenepolyamine such as diethylenetriamine, triethylenetetramine, or tetraethylenepentamine and a fatty acid such as lauric acid, myristic acid, palmitic acid, or stearic acid.

Examples of the quaternary ammonium salt include alkyltrimethylammonium salts such as lauryltrimethylammonium chloride.

Examples of the surfactant can include nonionic surfactants, cationic surfactants, anionic surfactants, and amphoteric surfactants. As the surfactant, these can be used singly or in combination of two or more.

Examples of the nonionic surfactant can include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene castor oil ether, hydrogenated castor oil ethylene oxide adduct, alkylamine ethylene oxide adduct, fatty acid amide ethylene oxide adduct, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant can include alkyldimethylbenzylammonium chloride, alkyltrimethylammonium chloride, alkyl dimethyl ethyl ammonium ethyl sulfate, higher alkylamine acetate, higher alkylamine hydrochloride, adduct of ethylene oxide to a higher alkylamine, condensate of a higher fatty acid and polyalkylene polyamine, a salt of an ester of a higher fatty acid and alkanolamine, a salt of higher fatty acid amide, imidazoline cationic surfactant, and alkyl pyridinium salt.

Examples of the anionic surfactant can include higher alcohol sulfate salts, higher alkyl ether sulfate salts, α-olefin sulfate salts, alkylbenzene sulfonate salts, α-olefin sulfonate salts, reaction products of fatty acid halide and N-methyl taurine, dialkyl sulfosuccinate salts, higher alcohol phosphate ester salts, and phosphate ester salts of higher alcohol ethylene oxide adduct.x Examples of the amphoteric surfactant can include amino acid amphoteric surfactants such as alkali metal salts of alkylaminopropionic acid, betaine amphoteric surfactants such as alkyldimethylbetaine, and imidazoline amphoteric surfactants.

Examples of molding methods for obtaining the glass-fiber-reinforced resin molded product of the present embodiment can include injection molding methods, injection compression molding methods, two-color molding methods, hollow molding methods, foam molding methods (including those with supercritical fluid), insert molding methods, in-mold coating molding methods, extrusion molding methods, sheet molding methods, thermoforming methods, rotational molding methods, laminate molding methods, press molding methods, blow molding methods, stamping molding methods, infusion methods, hand lay-up methods, spray-up methods, resin transfer molding methods, sheet molding compound methods, bulk molding compound methods, pultrusion methods, and filament winding methods. Among these methods, injection molding methods are preferred because of good manufacture efficiency.

Examples and Comparative Examples of the present invention will be shown.

EXAMPLES

Examples 1 to 4, Comparative Examples 1 to 4, Reference Example 1

First, a glass raw material (glass batch) prepared to have an E glass composition was supplied to a melting furnace, and melted at a temperature in the range of 1450 to 1550° C., and the resulting molten glass was drawn from a bushing including 200 nozzle tips to give a plurality of flat-cross-section glass filaments with a minor axis, major axis, irregular shape ratio R, and packing rate P shown in Table 1, the plurality of flat-cross-section glass filaments was bundled together; in this way, flat-cross-section glass fiber was manufactured. At that time, the nozzle tips each included a hole having a cross-section in flat shape, the cross-section having a major axis of specific length and a minor axis of specific length, and a wall including a notch to cool molten glass, and flat-cross-section glass fibers of Examples 1 to 4 and Comparative Examples 1 to 4 were obtained with the length of the minor axis in the hole being adjusted in the range of 0.2 to 2.5 mm, the ratio of the length of the major axis to the length of the minor axis in the hole being adjusted in the range of 2.0 to 6.5, and the amount of the molten glass passing through each of the nozzle tips being adjusted in the range of 0.1 to 3.0 g/min. The flat-cross-section glass filaments of Comparative Example 4 were long-oval-cross-section glass filaments each having a cross-section in long-oval shape, and the flat-cross-section glass fiber of Comparative Example 4 was long-oval-cross-section glass fiber including a plurality of long-oval-cross-section glass filaments.

The nozzle tips were replaced with those each including a hole having a cross-section in perfect circle shape, and circular-cross-section glass fiber of Reference Example 1 was obtained therewith.

Subsequently, frequency of filament breaking was counted and chopped strand productivity was determined for the flat-cross-section glass fibers of Examples 1 to 4 and Comparative Examples 1 to 4 and the circular-cross-section glass fiber of Reference Example 1 as shown below. Table 1 shows the results.

[Determination of Frequency of Filament Breaking]

When the flat-cross-section glass fibers of Examples 1 to 4 and Comparative Examples 1 to 4 and the circular-cross-section glass fiber of Reference Example 1 were manufactured for 30 days, the number of the occurrence of breaking of flat-cross-section glass filaments constituting each of the flat-cross-section glass fibers of Examples 1 to 4 and Comparative Examples 1 to 4 or the occurrence of breaking of circular-cross-section glass filaments constituting the circular-cross-section glass fiber of Reference Example 1 was counted. The mean number of breaking per shift was used as the frequency of filament breaking, wherein one shift corresponded to 8 hours. Cases with a frequency of filament breaking of less than 9 times per shift were rated as "A", cases with a frequency of filament breaking of 9 times or more and less than 10 times per shift as "B", and cases with a frequency of filament breaking of 10 times or more per shift as "C".

[Determination of Chopped Strand Productivity]

In manufacturing chopped strands for 240 hours by cutting glass strands, which had been obtained by coating the surfaces of the flat-cross-section glass fibers of Examples 1 to 4 and Comparative Examples 1 to 4 and the circular-cross-section glass fiber of Reference Example 1 with a composition containing a silane coupling agent, into pieces of 3 mm in length with a long-fiber cutting machine configured to send a glass strand between a cutter roller provided with cutters (cutting blades) radially disposed at equal intervals and a rubber roller rotatable in contact with the cutter roller and equipped with a rubber on the outer peripheral surface and cut the glass strand, the frequencies of exchanging the cutters were counted, and cases with a frequency of less than 20 times were rated as "A", cases with a frequency of 20 times or more and less than 30 times as "B", and cases with a frequency of 30 times or more as "C".

Next, the flat-cross-section glass fibers of Examples 1 to 4 and Comparative Examples 1 to 4 and the circular-cross-section glass fiber of Reference Example 1 were coated with a composition containing a silane coupling agent, and cut into pieces of 3 mm in length to give chopped strands of Examples 1 to 4, Comparative Examples 1 to 4, and Reference Example 1. Then, the chopped strands of each and polyamide 6 resin (manufactured by Ube Industries, Ltd., product name: UBE1015B) were kneaded with a twin-screw kneader (manufactured by SHIBAURA MACHINE CO., LTD., product name: TEM-26SS) at a screw rotational frequency of 100 rpm and a temperature of 270° C. to produce resin pellets of Examples 1 to 4, Comparative Examples 1 to 4, and Reference Example 1 each having a glass fiber content of 50% by mass.

Then, the resin pellets were injection-molded with an injection molding machine (manufactured by Nissei Plastic Industrial Co. Ltd., product name: NEX80) at a mold temperature of 80° C. and an injection temperature of 270° C. to form test pieces for warpage measurement each in the form of a plate having dimensions of 80 mm in length×60 mm in width×1 mm in thickness and type-A dumbbell test pieces (thickness: 4 mm) in accordance with JIS K 7165: 2008.

Next, the warpages of the test pieces of Examples 1 to 4, Comparative Examples 1 to 4, and Reference Example 1 for warpage measurement were measured as shown below. The tensile strengths of the type-A dumbbell test pieces of Examples 1 to 4, Comparative Examples 1 to 4, and Reference Example 1 were measured as shown below. Table 1 shows the results.

[Measurement of Warpage]

A corner of a test piece for warpage measurement was placed on a flat plane, and a gap generated between the corner at the diagonal position to the corner placed on the flat plane and the flat plane was measured with a caliper. Such a gap was measured for each of the four corners of the test piece for warpage measurement as placed on the flat plane, and cases with the mean of the measurements being 7.5 mm or less were rated as "A", cases with the mean of the measurements being more than 7.5 mm and 10.0 mm or less as "B", and cases with the mean of the measurements being more than 10.0 mm as "C".

[Measurement of Tensile Strength]

Each of the type-A dumbbell test pieces was subjected to static tensile test in accordance with JIS K 7165:2008 with a universal testing machine (manufactured by Shimadzu Corporation, product name: AUTOGRAPH AG-5000B) under a test temperature of 23° C. to measure the tensile strength. Cases with a tensile strength of 240 MPa or more were rated as "A", cases with a tensile strength of 230 MPa or more and less than 240 MPa as "B", and cases with a tensile strength of less than 230 MPa as "C".

stability (warpage) and mechanical-physical properties (tensile strength) comparable to those of the long-oval-cross-section glass fiber of Comparative Example 4 in glass-fiber-reinforced resin molded products.

On the other hand, it can be seen that the flat-cross-section glass fiber of Comparative Example 1, in which the packing rate P was less than 80.1% and the irregular shape ratio R and the packing rate P did not satisfy the formula (1) (less than 337.6), gave poor dimensional stability (warpage) and mechanical-physical properties (tensile strength) when being processed into a glass-fiber-reinforced resin molded product, and that the flat-cross-section glass fibers of Comparative Example 2 and Comparative Example 3, in each of which the irregular shape ratio R and the packing rate P did not satisfy the formula (1) (more than 421.2 or less than 337.6) gave poor dimensional stability (warpage) or poor spinnability (frequency of filament breaking) when being processed into a glass-fiber-reinforced resin molded product.

The invention claimed is:

1. Flat-cross-section glass fiber comprising a plurality of flat-cross-section glass filaments each having a cross-section in flat shape, the cross-section having a major axis in a range of 15.0 to 25.0 μm, a minor axis in a range of 8.0 to 12.0 μm, and an irregular shape ratio R, being a ratio of the major axis to the minor axis (major axis/minor axis), in a range of 1.5 to 3.0, wherein the flat-cross-section glass fiber has a packing rate P, being a ratio of a cross-sectional area of each flat-cross-section glass filament to an area of a rectangle circumscribing the cross-section of the flat-cross-section glass filament (cross-sectional area of flat-cross-section glass filament/area of rectangle circumscribing cross-section of flat-cross-section glass filament), in a range of 80.1 to 89.9%, and the irregular shape ratio R and the packing rate P satisfy following formula (1):

$$337.6 \leq P^{3/2}/R \leq 421.2 \qquad (1)$$

2. The flat-cross-section glass fiber according to claim 1, wherein the irregular shape ratio R and the packing rate P satisfy following formula (2):

$$361.9 \leq P^{3/2}/R \leq 382.5 \qquad (2)$$

3. A glass-fiber-reinforced resin composition comprising the flat-cross-section glass fiber according to claim 1 in a resin composition.

TABLE 1

|  | Example 1 | Example 2 | Example 3 | Example 4 | Comparative Example 1 | Comparative Example 2 | Comparative Example 3 | Comparative Example 4 | Reference Example 1 |
|---|---|---|---|---|---|---|---|---|---|
| Minor axis (μm) | 10.0 | 9.7 | 10.1 | 9.7 | 9.6 | 9.3 | 10.5 | 10.0 | 11.0 |
| Major axis (μm) | 20.0 | 20.3 | 19.6 | 20.4 | 20.5 | 24.1 | 17.5 | 20.0 | 11.0 |
| Irregular shape ratio R | 2.00 | 2.09 | 1.94 | 2.10 | 2.14 | 2.59 | 1.67 | 2.00 | 1.00 |
| Packing rate P (%) | 82.8 | 87.0 | 87.3 | 81.0 | 78.5 | 81.0 | 83.6 | 89.3 | 78.5 |
| $P^{3/2}/R$ | 376.7 | 388.3 | 420.5 | 347.1 | 325.0 | 281.5 | 457.7 | 421.9 | 695.5 |
| Tensile strength | A | A | A | B | C | A | C | A | C |
| Warpage | A | A | A | B | C | A | C | A | C |
| Frequency of filament breaking | A | A | B | A | A | C | A | C | A |
| Chopped strand productivity | A | B | B | A | A | A | A | C | A |

As can be seen from Table 1, the flat-cross-section glass fibers of Examples 1 to 4 gave better spinnability (frequency of filament breaking) and chopped strand productivity than those of the long-oval-cross-section glass fiber of Comparative Example 4 in combination with keeping dimensional 4. A glass-fiber-reinforced resin molded product formed from the glass-fiber-reinforced resin composition according to claim 3.

* * * * *